(12) United States Patent
Kaule et al.

(10) Patent No.: US 11,649,943 B2
(45) Date of Patent: May 16, 2023

(54) LIGHT FIXTURE

(71) Applicant: Kohler Co., Kohler, WI (US)

(72) Inventors: Brian M. Kaule, Sheboygan, WI (US); Nicholas R. Rindt, Grafton, WI (US); Dennis L. Snyder, Sheboygan, WI (US)

(73) Assignee: Kohler Co.

( * ) Notice: Subject to any disclaimer, the term of this patent is extended or adjusted under 35 U.S.C. 154(b) by 0 days.

(21) Appl. No.: 17/743,940

(22) Filed: May 13, 2022

(65) Prior Publication Data

US 2022/0268419 A1 Aug. 25, 2022

Related U.S. Application Data

(62) Division of application No. 17/014,530, filed on Sep. 8, 2020, now Pat. No. 11,346,525.

(60) Provisional application No. 62/903,792, filed on Sep. 21, 2019.

(51) Int. Cl.
*F21V 3/06* (2018.01)
*F21S 8/00* (2006.01)
*F21V 17/06* (2006.01)
*F21V 8/00* (2006.01)

(52) U.S. Cl.
CPC ...... *F21V 3/06* (2018.02); *F21S 8/03* (2013.01); *F21V 17/06* (2013.01); *G02B 6/001* (2013.01)

(58) Field of Classification Search
CPC ............. F21V 9/12; F21V 17/06; F21L 15/04
See application file for complete search history.

(56) References Cited

U.S. PATENT DOCUMENTS

| 1,184,906 A | * | 5/1916 | Wiednhoeft | ............ F21V 17/06 362/435 |
| 1,464,894 A | | 8/1923 | Webb | |
| 1,484,268 A | * | 2/1924 | Lieske | .................... F21V 17/06 362/438 |
| 1,614,004 A | * | 1/1927 | Larson | ...................... F21V 3/00 362/361 |
| 2,063,296 A | | 12/1936 | Braune | |

(Continued)

FOREIGN PATENT DOCUMENTS

| CN | 102313161 | 1/2012 |
| CN | 202791794 | 3/2013 |

(Continued)

OTHER PUBLICATIONS

Lacemaker Fixture at the Waelderhaus Available at least as early as Sep. 18, 2019.

*Primary Examiner* — Eric T Eide
(74) *Attorney, Agent, or Firm* — The Belles Group, P.C.

(57) ABSTRACT

A light fixture includes a light receiver, an electrically-powered light source coupled to the light receiver, and a vessel containing a liquid. The vessel is translucent such that the light from the light source radiates through the vessel. The vessel includes an outer wall and an inner wall that define an enclosed area that receives and contains the liquid. The inner wall defines an open area positioned radially inward from the enclosed area and the inner wall includes a top opening and a bottom opening such that the open area is a through-hole extending through the enclosed area. The vessel is configured such that light emitted from the light source passes through the liquid contained within the vessel.

20 Claims, 13 Drawing Sheets

(56) References Cited

U.S. PATENT DOCUMENTS

| | | | |
|---|---|---|---|
| 2,448,318 A * | 8/1948 | Lowery | F21V 33/00 |
| | | | 362/101 |
| D388,892 S * | 1/1998 | Ratia | D26/9 |
| 7,798,673 B2 * | 9/2010 | Yang | F21S 10/002 |
| | | | 362/101 |
| 8,641,214 B1 * | 2/2014 | Batchko | G02F 1/0107 |
| | | | 40/407 |
| 9,625,138 B2 | 4/2017 | Wang | |
| 10,247,968 B2 * | 4/2019 | Batchko | F21V 9/40 |
| 2007/0147024 A1 | 6/2007 | Wu | |
| 2008/0025026 A1 | 1/2008 | Lee et al. | |
| 2010/0301727 A1 | 12/2010 | Lenk et al. | |
| 2015/0261076 A1 * | 9/2015 | Dijken | F21V 9/32 |
| | | | 977/774 |
| 2019/0249838 A1 | 8/2019 | Wang | |
| 2021/0088198 A1 | 3/2021 | Kaule | |

FOREIGN PATENT DOCUMENTS

| | | |
|---|---|---|
| CN | 204062953 | 12/2014 |
| CN | 104728642 | 6/2015 |
| CN | 207740801 | 8/2018 |
| CN | 209026548 | 6/2019 |

* cited by examiner

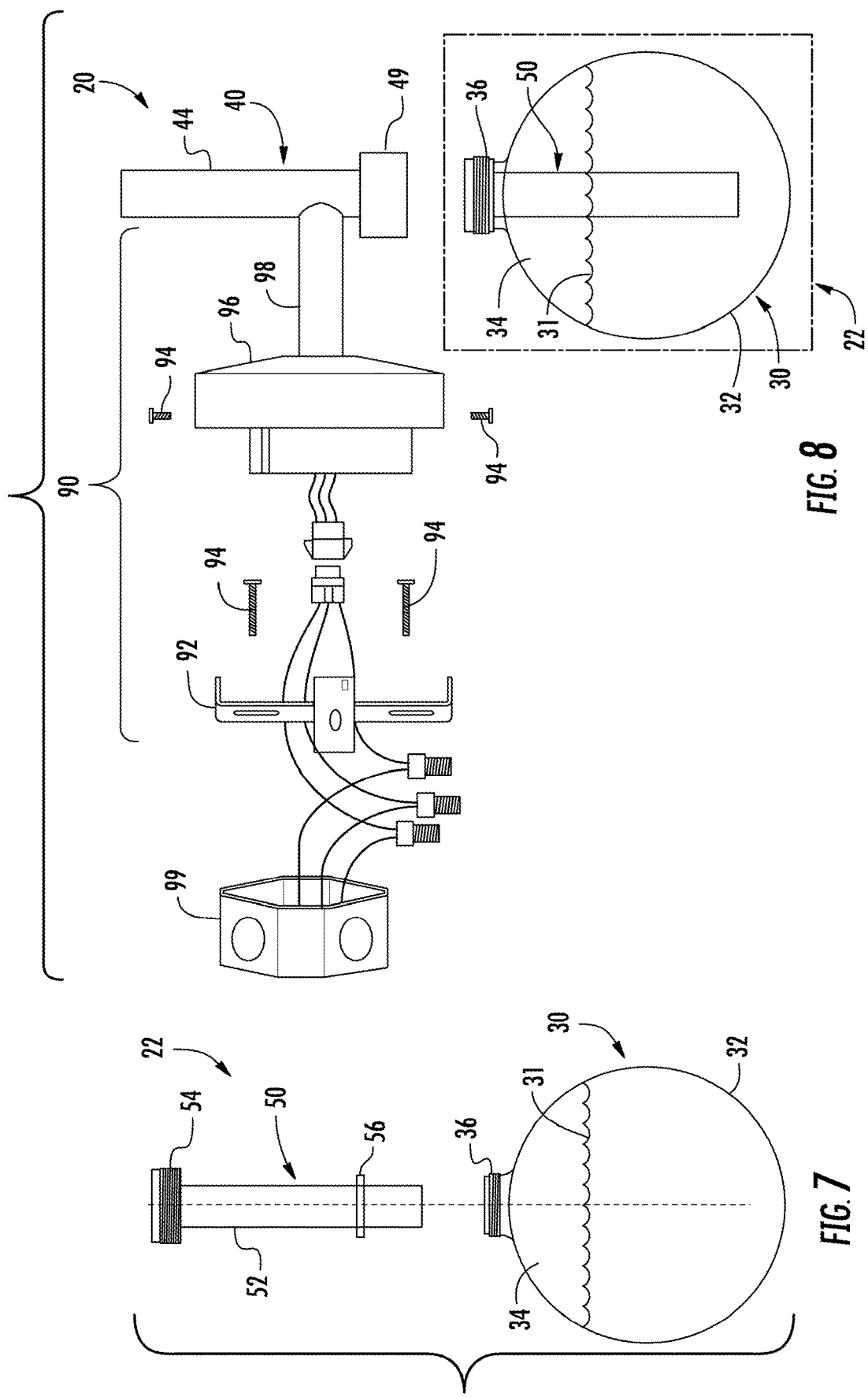

LIGHT FIXTURE

CROSS-REFERENCE TO RELATED PATENT APPLICATION

The present application is a divisional patent application of U.S. patent application Ser. No. 17/014,530, filed Sep. 8, 2020, to be issued as U.S. Pat. No. 11,346,525, which in turn claims the benefit U.S. Provisional Patent Application No. 62/903,792, filed Sep. 21, 2019, the entireties of which are hereby incorporated herein by reference.

BACKGROUND

The present application relates generally to the field of light fixtures. More specifically, this application relates to light fixtures that utilize vessels that are at least partially filled with a liquid.

SUMMARY

One embodiment relates to a light fixture that includes a light receiver, an electrically-powered light source coupled to the light receiver, and a vessel containing a liquid. The vessel is configured such that light emitted from the light source passes through the liquid contained within the vessel.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 7 is an exploded, side view of a light dispersing structure of the light fixture of FIG. 1.

FIG. 8 is an exploded, side view of the light fixture of FIG. 1.

DETAILED DESCRIPTION

Figure 1:
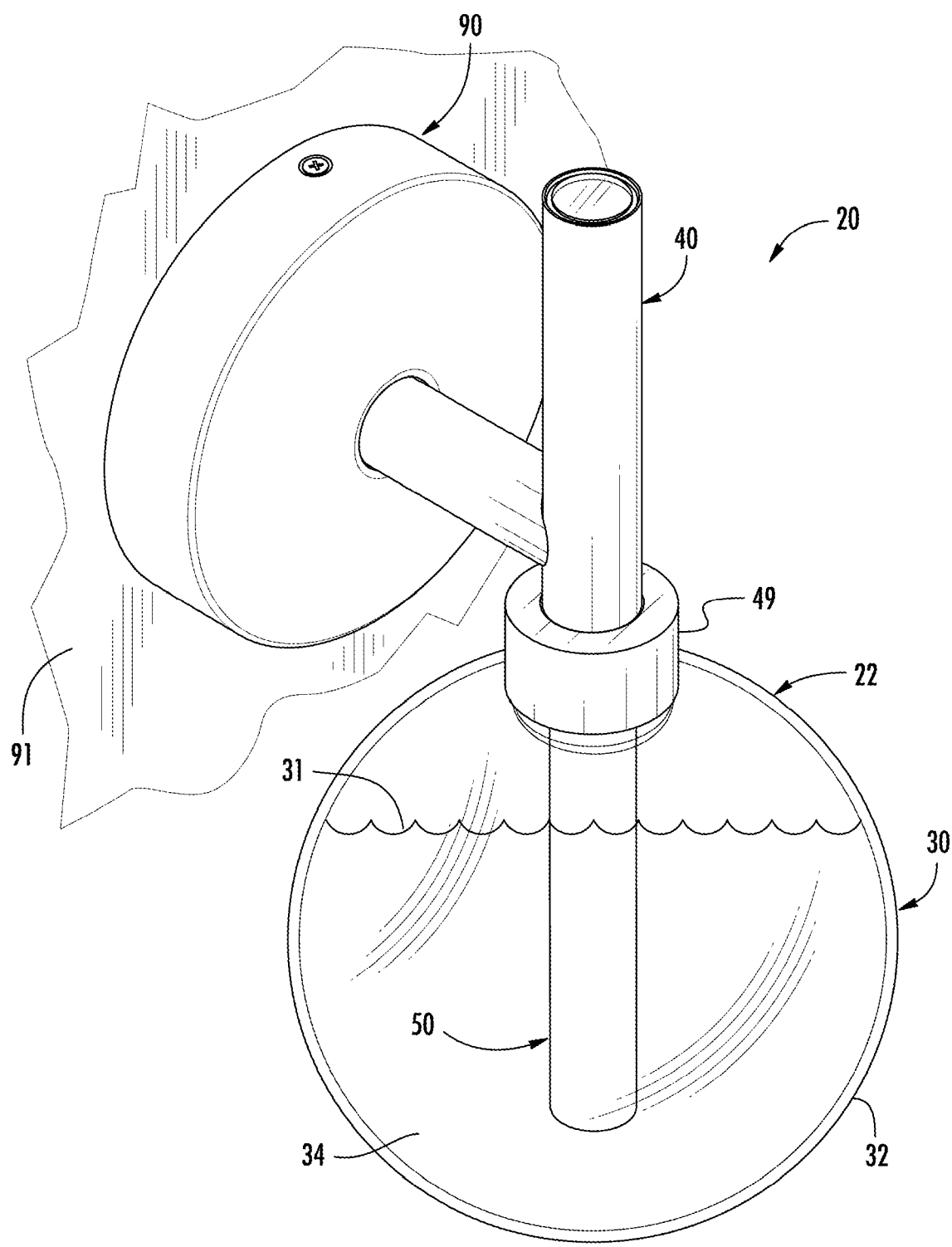
FIG. 1 is a perspective view of a light fixture according to one embodiment.

At least one embodiment of this disclosure relates to a light fixture that includes a vessel for containing a liquid and a member or element that includes a socket or other structure for coupling an electrically-powered light source (e.g., one or more light emitting diodes (LEDs) or a light bulb such as an incandescent, fluorescent, LED, or other type of bulb) to the light fixture (hereinafter referred to as a "light receiver" in the interest of brevity). The light receiver is configured to receive and couple to at least a portion of a light source. The vessel is configured to receive and contain a liquid and also to circumferentially surround the light receiver and at least a portion of the light that is emitted from the light source that is received by the light receiver.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are light fixtures that include a light source within (or surrounded by) a vessel that is configured to contain a liquid, such as water. By positioning the light source within the vessel, the light radiates through the liquid and is distributed about the surrounding environment (e.g., room) in a different manner than if it were not traveling through a liquid. FIGS. 1-8 illustrate one exemplary embodiment of a light fixture 20 that includes a light receiver 40, a light dispersing structure 22 (which includes a vessel 30 and a light guide 50), a light source 70, and a mounting structure 90. The light retainer or receiver 40 is configured to couple to the light source 70 to retain light source 70 in the light fixture 20, and includes a socket or other structure for receiving the light source 70.

Figure 3:
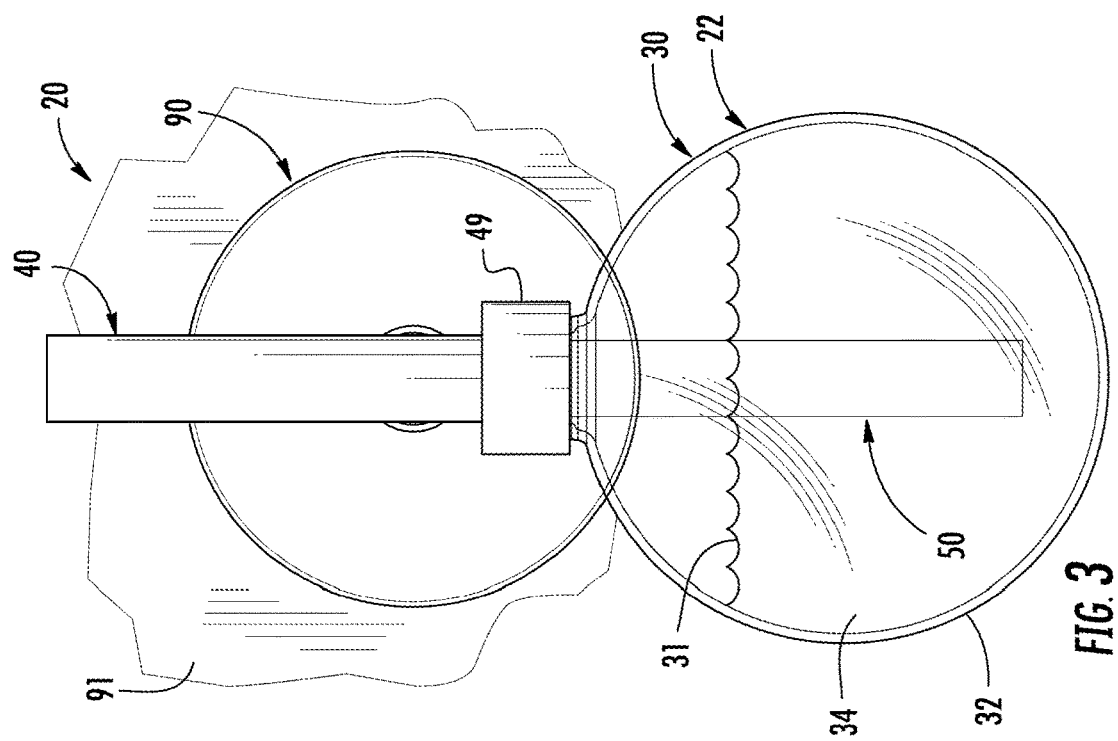
FIG. 3 is a front view of the light fixture of FIG. 1.
Figure 2:
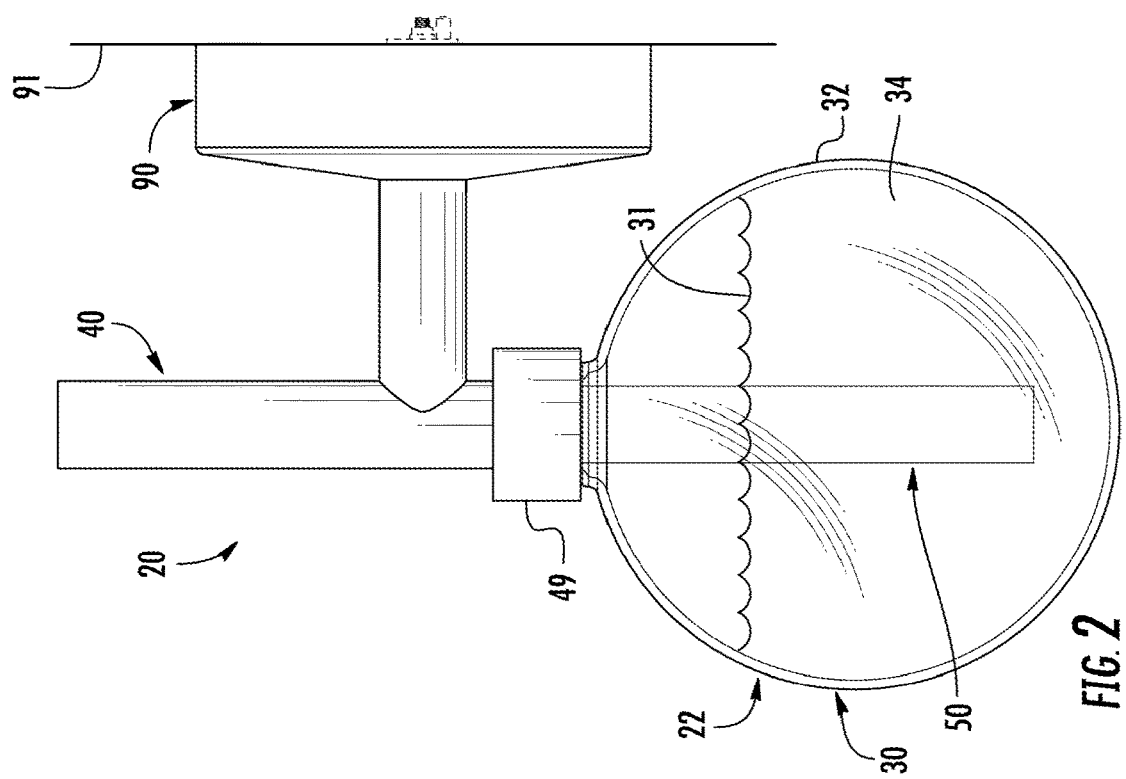
FIG. 2 is a side view of the light fixture of FIG. 1.

The vessel 30 is substantially hollow (prior to assembly) and is configured to receive and contain a liquid 31 (e.g., water, although a variety of different liquids may be used). As described further herein, the vessel 30 is configured to circumferentially surround at least a portion of the light that is emitted from the light source 70 (when the light source 70 is received by and coupled to the light receiver 40 and is emitting a light). The vessel 30 is configured such that light emitted from the light source 70 passes through the liquid 31 contained within the vessel 30. Accordingly, as shown in FIGS. 1-3, the vessel 30 includes an outer wall 32 that defines a hollow inner area 34 that is configured to receive and contain the liquid 31 and optionally at least a portion of the light guide 50, the light receiver 40, and/or the light source 70. Accordingly, the vessel 30 circumferentially surrounds at least a portion of the light guide 50, the light receiver 40, and/or the light source 70. According to one embodiment, the vessel 30 may not include any inner walls within the outer wall 32 such that the hollow inner area 34 is completely open and extends radially between the inner surfaces of the outer wall 32.

Figure 4:
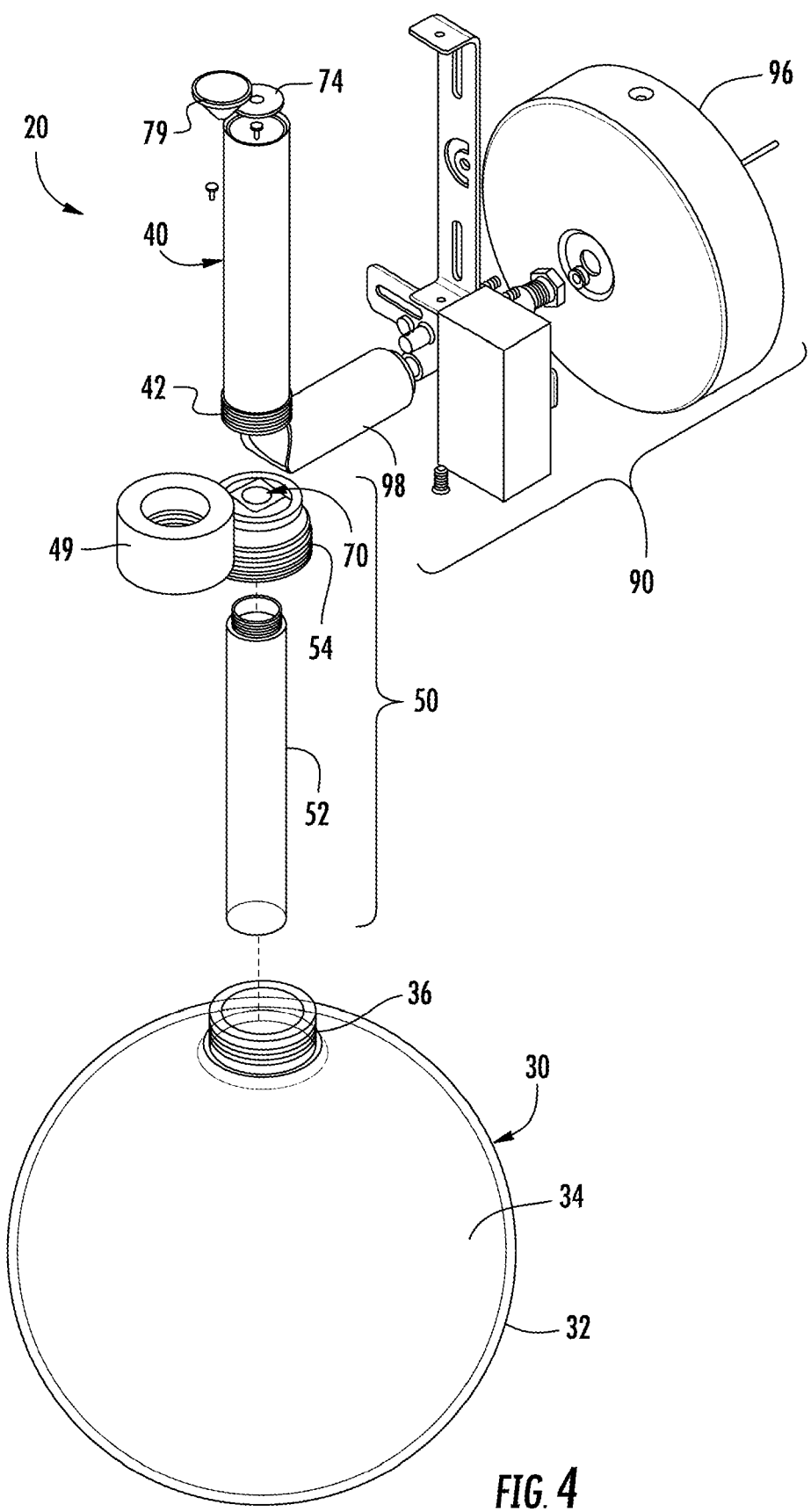
FIG. 4 is an exploded, perspective view of the light fixture of FIG. 1.
Figure 5:
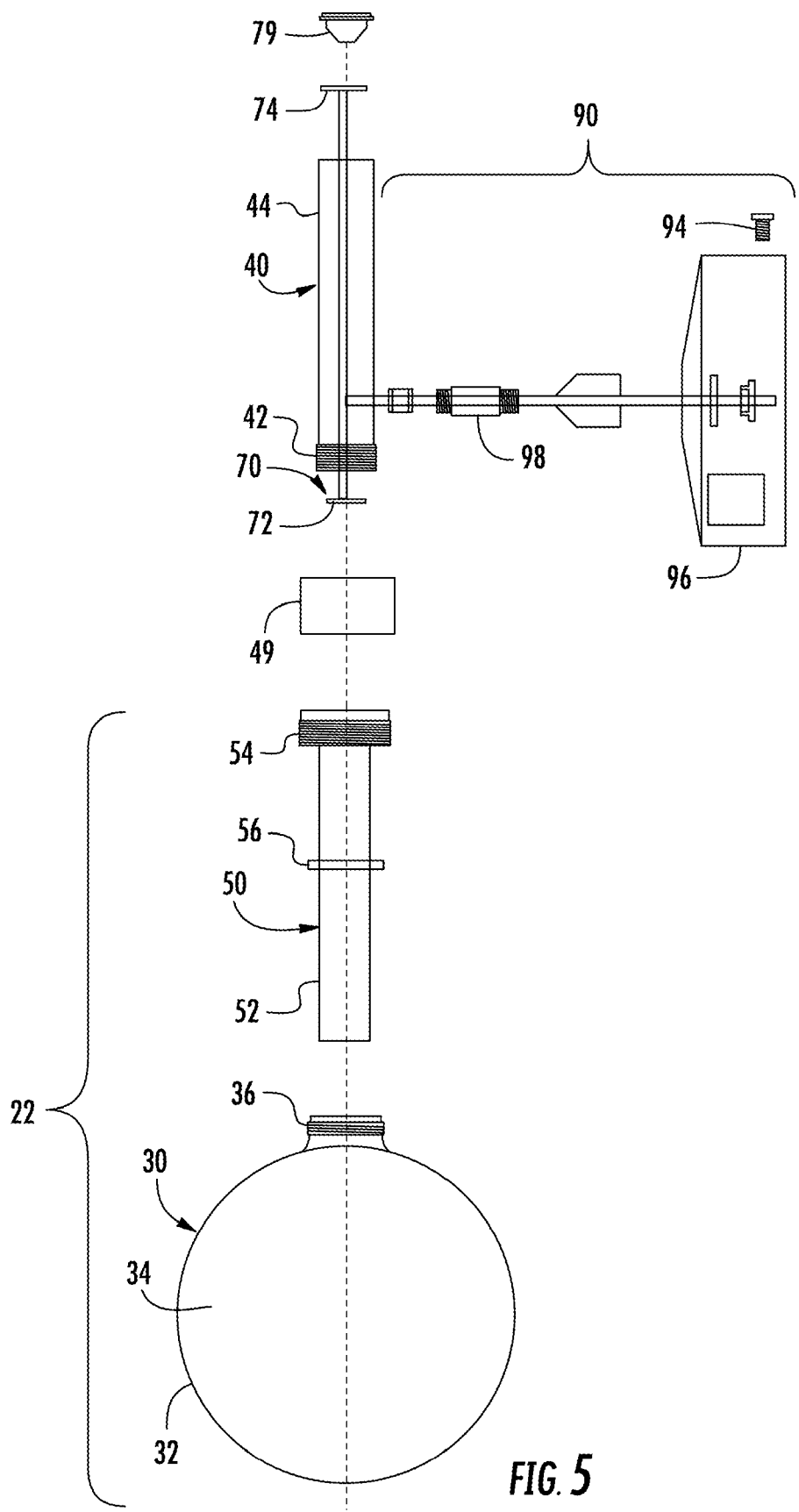
FIG. 5 is an exploded, side view of the light fixture of FIG. 1.
Figure 6:
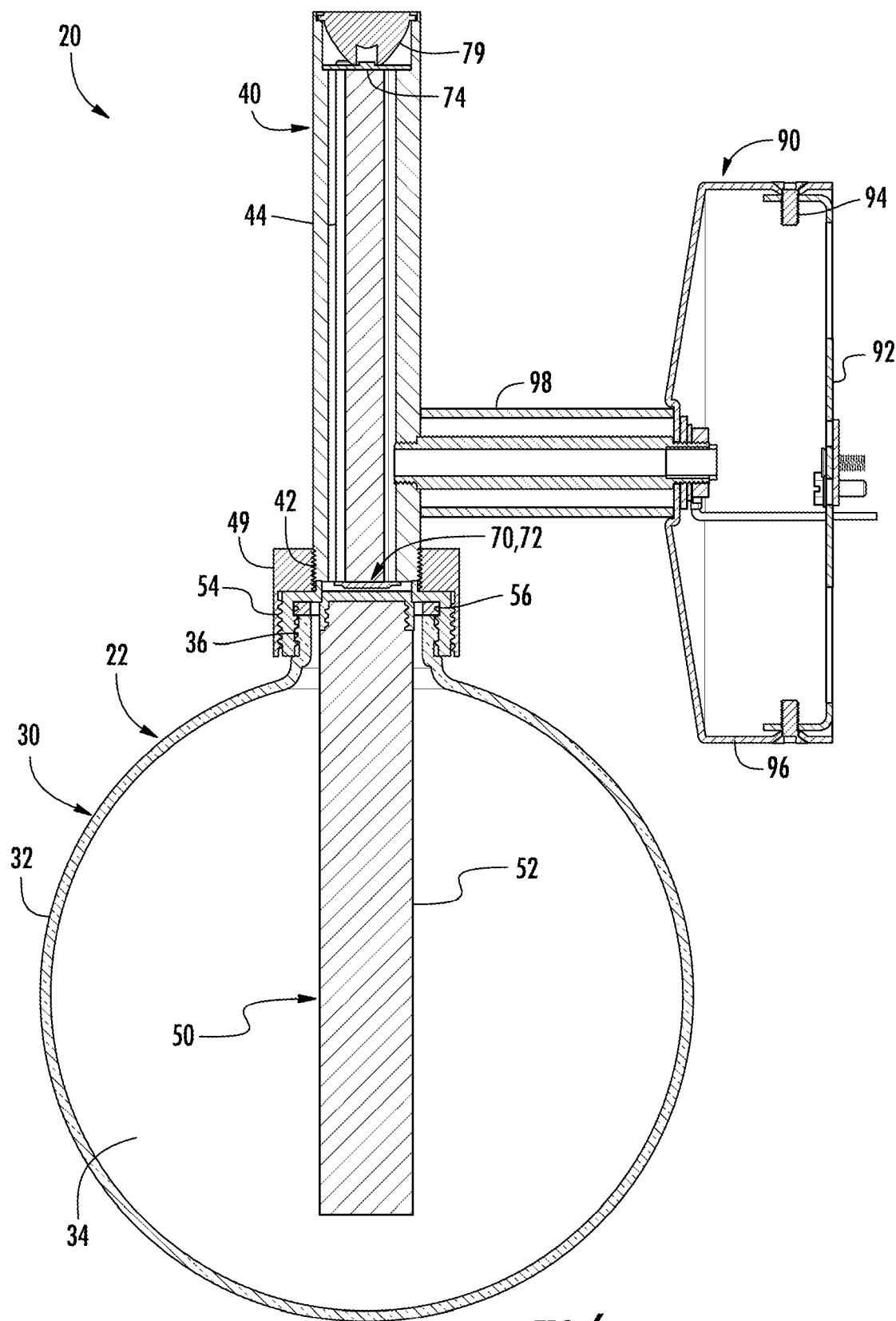
FIG. 6 is a cross-sectional, side view of the light fixture of FIG. 1.

As shown in FIGS. 4-6, the outer wall 32 includes a spout 36 that defines an opening through which the user can access the inner area 34 to add liquid 31 to, remove liquid 31 from, or replace the liquid 31 within the inner area 34. In particular, the liquid 31 can be poured through the opening of the spout 36 and into the inner area 34, and at least a portion of the light guide 50 and/or the light source 70 can be inserted into the opening of the spout 36 to be at least partially received within the inner area 34. The liquid 31 can also be emptied from the vessel 30 through the spout 36. The liquid 31, the light guide 50, and the light source 70 may optionally also be removed from the inner area 34 through the spout 36. Aside from the opening defined by the spout 36, the vessel 30 does not define any other openings (and therefore only defines the one opening through the spout 36) that lead into the inner area 34 (and through which the liquid 31 can enter into and exit from the inner area 34 of the vessel 30). Accordingly, when the vessel 30 is attached to the rest of the light fixture 20 (in particular the light guide 50), the inner area 34 is fully enclosed. Without the vessel 30 is attached to the rest of the light fixture 20, the inner area 34 is fully enclosed aside from the opening through the spout 36.

According to one embodiment, the outer wall 32 has a substantially spherical or globe shape (aside from the spout 36) to distribute light from the light source 70 through a given space (e.g., a room). However, the outer wall 32 may have a variety of different shapes, depending on the desired configuration. The vessel 30 may be constructed out of a variety of translucent or transparent materials, including but not limited to glass such that the light from the light source 70 radiates through the vessel 30 and into the surrounding environment that the vessel 30 is positioned within.

Although the vessel 30 is configured to receive and contain the liquid 31, the light fixture 20 can still be properly operated without putting any liquid 31 into the vessel 30. Furthermore, the vessel 30 may be completely or partially filled with liquid 31, according to the desired configuration. Although the liquid 31 is illustrated in FIGS. 1-3 as only partially filling the vessel 30, it should be understood by those reviewing the present disclosure that water level may vary according to other exemplary embodiments. For example, the liquid 31 may fill substantially all of the available empty space in the vessel 30 according to one particular exemplary embodiment. According to one embodiment, the vessel 30 may be approximately 90% full of liquid 31 (prior to assembly with the rest of the light dispersing structure 22). According to other exemplary embodiments, the water level may be higher or lower than that illustrated in the accompanied drawings, for any of the illustrated embodiments shown and described therein.

The light receiver 40 is configured to receive and optionally provide power to the light source 70, which is electrically powered and coupled to the light receiver 40. In particular, the light receiver 40 secures the light source 70 to the rest of the light fixture 20. As shown in FIGS. 5-6 and 8, the light receiver 40 is configured to attach the light dispersing structure 22 to the mounting structure 90. As shown in FIGS. 5-6, the light receiver 40 includes a light socket or receptacle 42 that is configured to attach, secure, and provide or transmit power (e.g., electrical power) to the light source 70 (as shown in FIG. 4, the light source 70 may also be attached to the attachment member 54). As shown in FIG. 6, the light receiver 40 may also include a heat sink 44 to disperse or release heat from the light source 70.

The light guide 50 (which may be a light transmitter) is configured to guide and transmit light from the light source 70 and into the vessel 30. The light guide 50 includes a stick or tube 52 that is configured to be at least partially positioned within the hollow inner area 34 of the vessel 30 (as shown in FIGS. 1-3, 6, and 8) and to transmit, channel, and disperse light from the light source 70 into the vessel 30. The tube 52 is constructed out of a material (such as plastic) that is configured to transmit light. A bottom end, at least a portion of the length, and optionally a top end of the tube 52 is positioned within the hollow inner area 34 of the vessel 30 such that the vessel 30 circumferentially surrounds at least a portion the tube 52 of the light guide 50. Accordingly, when the vessel 30 contains the liquid 31 (within the hollow inner area 34), at least a portion of the tube 52 of the light guide 50 is positioned within, directly contacts, and is surrounded by the liquid 31 such that the tube 52 displaces the liquid 31 within the vessel 30 (depending on the length of the tube 52 and the amount of liquid 31 in the vessel 30). The light from the light guide 50 is transmitted through the inner area 35 and the outer wall 32 (and through any liquid 31 within the inner area 35) before transmitting to the rest of the environment that the light fixture 20 is positioned within.

As shown in FIGS. 4-6, the light source 70 is positioned along the top end of the tube 52. The tube 52 is configured to transmit and guide the light from the light source 70 completely along the length, width, and depth of the entire tube 52, from the top end (where the light source 70 is positioned) to the bottom end of the tube 52 (which is positioned within the vessel 30). The tube 52 may optionally be at least partially hollow along the top end such that at least a portion of the light source 70 can be positioned and received within the top end of the tube 52. Alternatively, the tube 52 may be a solid piece of material. Due to the light guide 50, the light receiver 40 positions and holds the light source 70 outside of the vessel 30 while the light guide 50 still transmits the light from the light source 70 into the vessel 30. To fit at least partially through the spout 36 of the vessel 30 and into the inner area 34 of the vessel 30, the outer diameter of the tube 52 is smaller than the inner diameter of the spout 36 to extend at least partially into and through the spout 36, as shown in FIG. 6.

Additionally, as shown in FIGS. 4-6, the light guide 50 includes a cap or attachment member 54 that is configured to removably and reattachably (and independently and separately) attach the rest of the light guide 50 to both the vessel 30 (via inner threads) and the light receiver 40 (via outer threads and the attachment ring 49 (as described further herein)). In particular, the attachment member 54 is positioned along and attached to the top end of the tube 52. The top portion of the attachment member 54 is attached to the tube 52. The bottom portion of the attachment member 54 is radially spaced apart from the outer surface of the tube 52 such that the top portion of the spout 36 of the vessel 30 is positioned radially between the attachment member 54 and the tube 52. The bottom portion of the attachment member 54 includes inner threads (along an inner surface) and outer threads (along an outer surface. The attachment member 54 is configured to attach to the spout 36 of the vessel 30 via the inner threads of the attachment member 54 and outer threads of the spout 36 or, alternatively, via a press-fit attachment between the inner surface of the attachment member 54 and the outer surface of the spout 36. The attachment member 54 is configured to attach to the light receiver 40 via the attachment ring 49. In particular, the outer threads of the attachment member 54 are configured to attach to the lower inner threads of the attachment ring 49) (as described further herein). Alternatively, the outer surface of the attachment member 54 may attach to the inner surface of the attachment ring 49 via a press-fit attachment. The attachment member 54 may also attach directly to a lower end of the light receiver 40.

As shown in FIGS. 5-6, the light guide 50 includes a seal member 56 that is configured to fluidly seal the light guide 50 to the vessel 30, which prevents any liquid from leaking out of the vessel 30 through the spout 36. The seal member 56 may be constructed out of a variety of different sealing materials (including but not limited to rubber or silicone) and may be a ring or loop. The seal member 56 is positioned around the tube 52 (along the length of the tube 52) prior to attachment to the vessel 30 (as shown in FIGS. 5 and 7) and moves up along the length of the tube 52 toward the top end of the tube 52 and toward the attachment member 54 (as shown in FIG. 6) as the light guide 50 is being attached to the vessel 30. According to one embodiment as shown in FIG. 6, once the tube 52 is at least partially inserted into the inner area 34 through the spout 36, the attachment member 54 extends over and attaches to the outer surface of the spout 36 (via a threaded attachment, for example), and the seal member 56 is positioned between and seals to the top or inner surface of the spout 36 and an inner surface of the attachment member 54 and/or an outer surface of the tube 52.

The light guide 50 is configured to be independently removably and reattachably attachable to the light receiver 40 (e.g., independent from the vessel 30) to allow the vessel 30 to be independently removable from the rest of the light fixture 20 (without removing the light guide 50 from the light receiver 40, for example). Since the light guide 50 is independently attachable to the light receiver 40 (through the attachment ring 49 and the attachment member 54) without the vessel 30, the vessel 30 can be independently removed from the rest of the light fixture 20 to, for example, fill the vessel 30 with liquid 31, remove the liquid 31 from the vessel 30, or replace the liquid 31 in the vessel 30. According to one embodiment as shown in FIG. 6, the light fixture 20 further includes an attachment ring 49 to removably attach the bottom end of the light receiver 40 to the top end of the light guide 50 (in particular to the attachment member 54 of the light guide 50). The attachment ring 49 may only attach the light receiver 40 and the light guide 50 together (and not the vessel 30, which may only be attached to the light guide 50 (via the attachment member 54 and the spout 36)). In particular, the inner surface of the attachment ring 49 attaches (via, for example, threads) to both the outer surface of the bottom end of the light receiver 40 and the outer surface of the attachment member 54 of the light guide 50. A top portion of the inner surface of the attachment ring 49 threadably attaches to an outer surface of a bottom portion or end of the light receiver 40. A bottom portion of the inner surface of the attachment ring 49 threadably attaches to an outer surface of the attachment member 54 of the light guide 50. Once attached, the light source 70 may be positioned within and extend through a middle area of the attachment ring 49. Alternatively, the light source 70 may be positioned along a top portion of the light receiver 40.

The light source 70 is configured to emit light and may be any of a variety of different types of light-emitting devices. According to an exemplary embodiment, the light source 70 includes a light emitting diode (LED) light source (such as a printed circuit board light-emitting device (PCB-LED) 74) and a chip on board (COB) 72, as shown in FIGS. 5-6. The PCB-LED 74 also emits light (in addition to the COB 72) through the bottom of the light receiver 40 and into the light guide 50. The COB 72 is configured to provide a relatively large amount of lumens in a relatively small space. As shown in FIGS. 5-6, the light source 70 (in particular the COB 72) is attached to, positioned along, and received by a lower end of the light receiver 40, which may optionally provide power to the light source 70 (through wires (as shown in FIG. 8) that extend through a wall 91 and the mounting structure 90). The PCB-LED 74 may be attached to and positioned along an upper end of the light receiver 40. Of course, other types of light sources may be used according to other exemplary embodiments. For example, a light bulb (e.g., incandescent, fluorescent, LED, etc.) may be received by the light receiver 40 such that the light bulb emits light into the tube 52. The light bulb may optionally be at least partially received within the tube 52 for insertion into the vessel 30.

The light receiver 40 positions the light source 70 such that the light is directed into the top end of the tube 52 and into the vessel 30 (through the spout 36). In particular, the light receiver 40 positions the light source 70 along the top end of the tube 52 to transmit light into the tube 52. The light source 70 may be positioned completely outside of or may optionally extend at least partially into the top end of the tube 52 (as well as the vessel 30). The light fixture 20 may further include a lens 79 (as shown in FIGS. 4-6) to direct the light from the light source 70 according to the desired configuration. The lens 79 may be attached to the light receiver 40 along with the light source 70.

As shown in FIGS. 1-3, the mounting structure 90 (such as a wall mount structure) is configured to mount or attach the rest of the light fixture 20 to a support structure, such as the wall 91. However, the light fixture 20 may include other mounting structures or hardware to allow the light fixture 20 to be positioned along or attached to other support structures or areas, including but not limited to a door, a floor, or a table. As shown in FIG. 8, wiring to power the light source 70 may extend from an outlet box 99 and through the mounting structure 90 (and the light receiver 40) to power and control the light source 70. As shown in FIGS. 6 and 8, the mounting structure 90 includes various mounting hardware components, such as a mounting bracket or plate 92, fasteners 94 (e.g., screws), a canopy or mounting cover 96, and a connecting screw or piece 98. The connecting piece 98 is configured to attach the mounting cover 96 to the light receiver 40.

To assemble the light fixture 20, the vessel 30 may optionally first be at least partially filled with the liquid 31. Subsequently, the light guide 50 is inserted through the spout 36 of the vessel 30 (as shown in FIG. 7) such that the bottom end and at least a portion of the length of the tube 52 is positioned completely within the inner area 34 of the vessel 30 (as shown in FIG. 8) (and optionally at least partially within the liquid within the vessel 30) and the seal member 56 moved upward along the length of the tube 52 toward the top end of the tube 52. The light guide 50 is then attached to the vessel 30 by attaching (e.g., threadably attaching) the inner surface of the attachment member 54 to the outer surface of the spout 36 and sealing the seal member 56 between the top end of the spout 36 and the tube 52 and/or a bottom inner surface of the attachment member 54, thereby assembling the light dispersing structure 22. The light source 70 is attached to the light receiver 40, and the light dispersing structure 22 and the light receiver 40 are attached together by attaching (e.g., threadably attaching or screwing) the attachment ring 49 onto and over the lower end of the light receiver 40 and onto and over the attachment member 54 of the light guide 50 (such that at least a portion of both the light receiver 40 and the attachment member 54 are positioned within the attachment ring 49). The mounting structure 90 is mounted to the wall 91, and appropriate wiring is electrically connected to power the light fixture 20. To disassemble the light fixture 20, the opposite steps may be used. However, as described further herein, the vessel 30 may be separately and independently removed from the light fixture 20.

Unless otherwise specified herein, the various components of the light fixture 20 may be constructed out of a variety of different materials such as steel, plastic, brass, ceramic, copper, iron, and aluminum. Additionally, while illustrated as having one particular overall aesthetic configuration in FIGS. 1-3, any of a variety of other configurations that utilize a vessel for containing a liquid therein and for receiving a light source may also be utilized according to other exemplary embodiments.

FIGS. 9-17 illustrate another exemplary embodiment of a light fixture 120 that includes a light receiver 140, a vessel 130 for containing a liquid, a light source 170, and a mounting structure 190. The light fixture 120 has a configuration is the same as or similar to the light fixture 20, except where noted otherwise (and vice versa). Additionally, the light receiver 140, the vessel 130, the light source 170, and the mounting structure 190 have a configuration that is the same as or similar to the light receiver 40, the vessel 30, the light source 70, and the mounting structure 90, respectively, except where noted otherwise (and vice versa).

Figure 14:
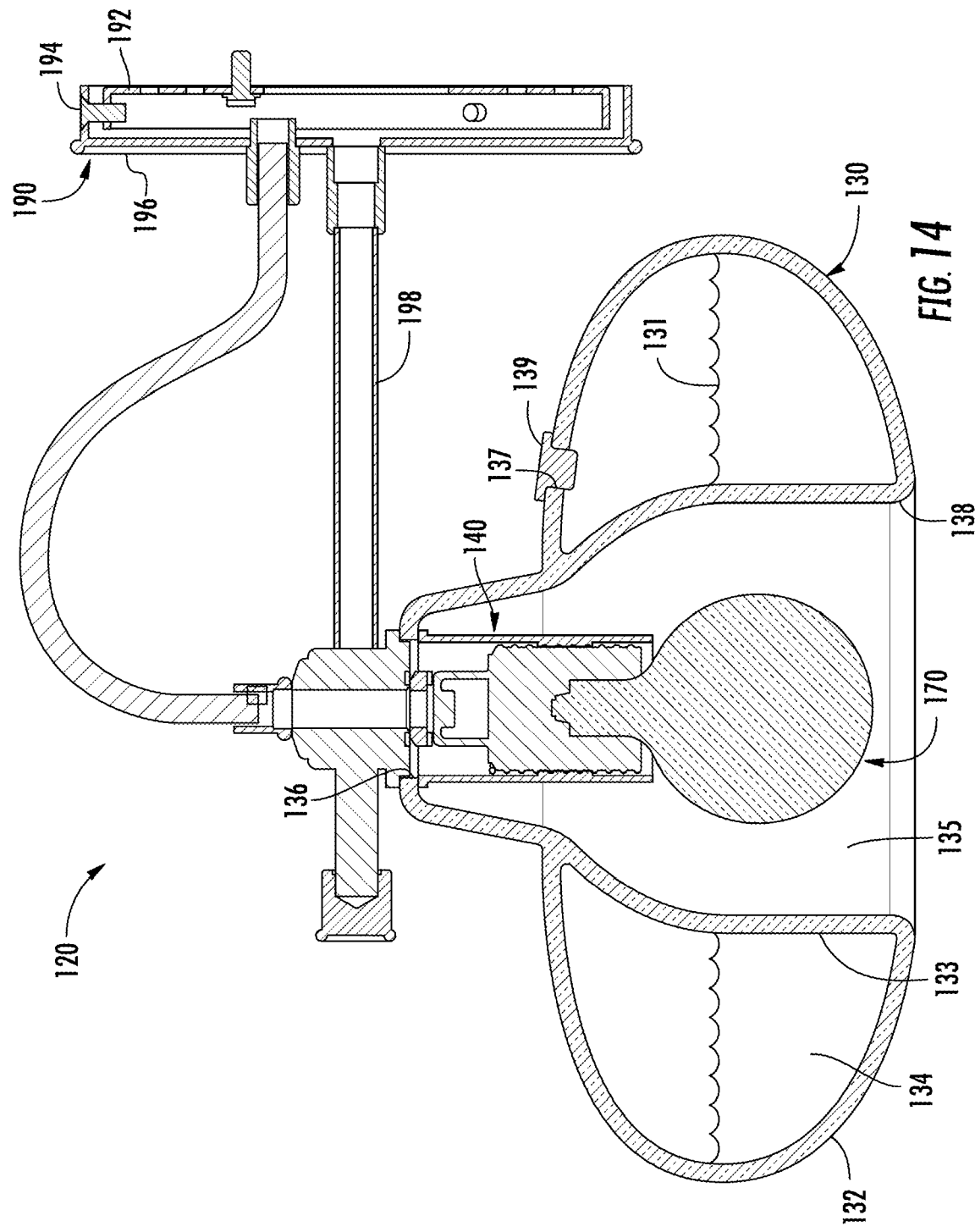
FIG. 14 is a cross-sectional, side view of the light fixture of FIG. 9.
Figure 15:
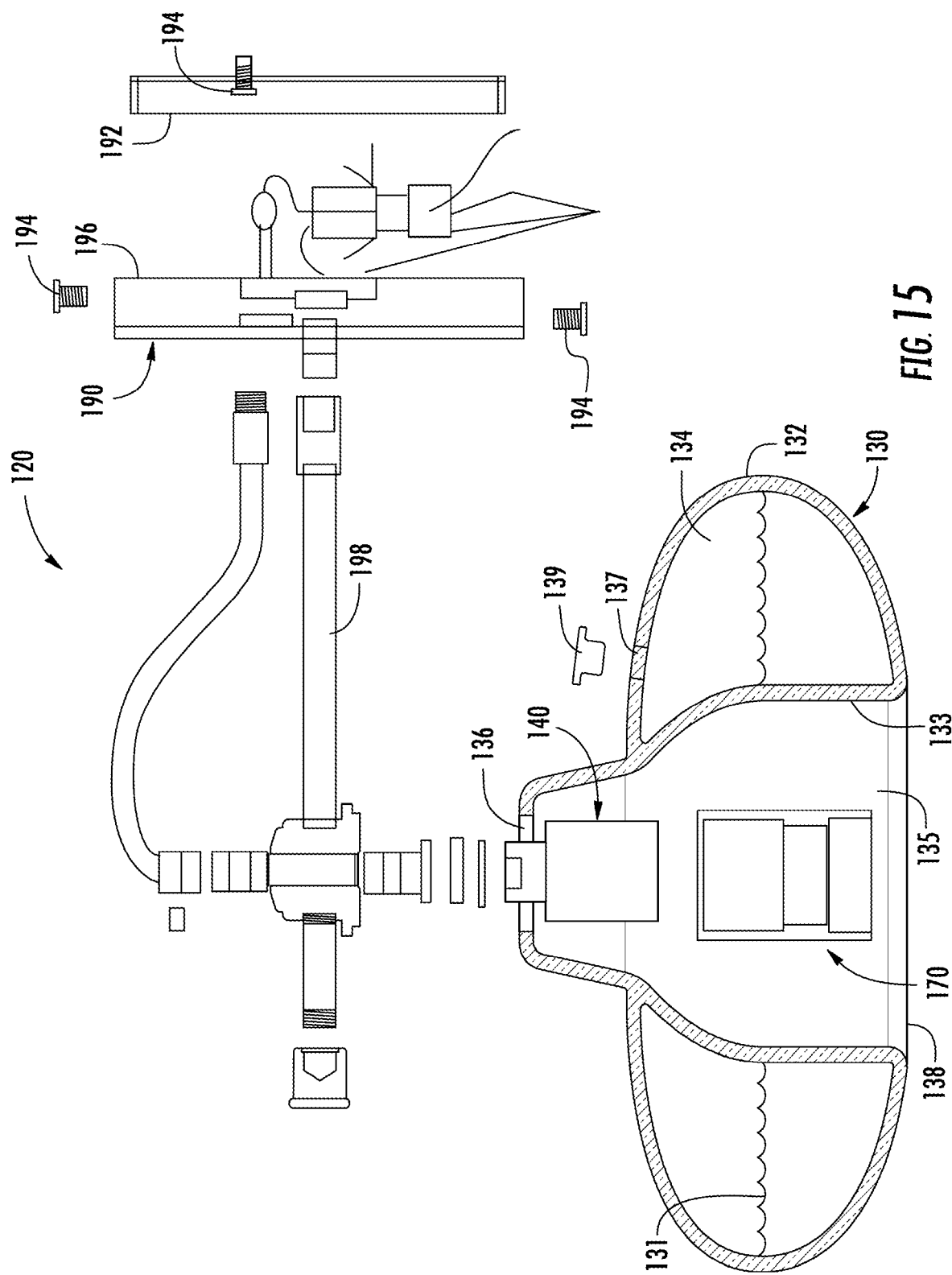
FIG. 15 is a cross-sectional, exploded, side view of the light fixture of FIG. 9.
Figure 16:
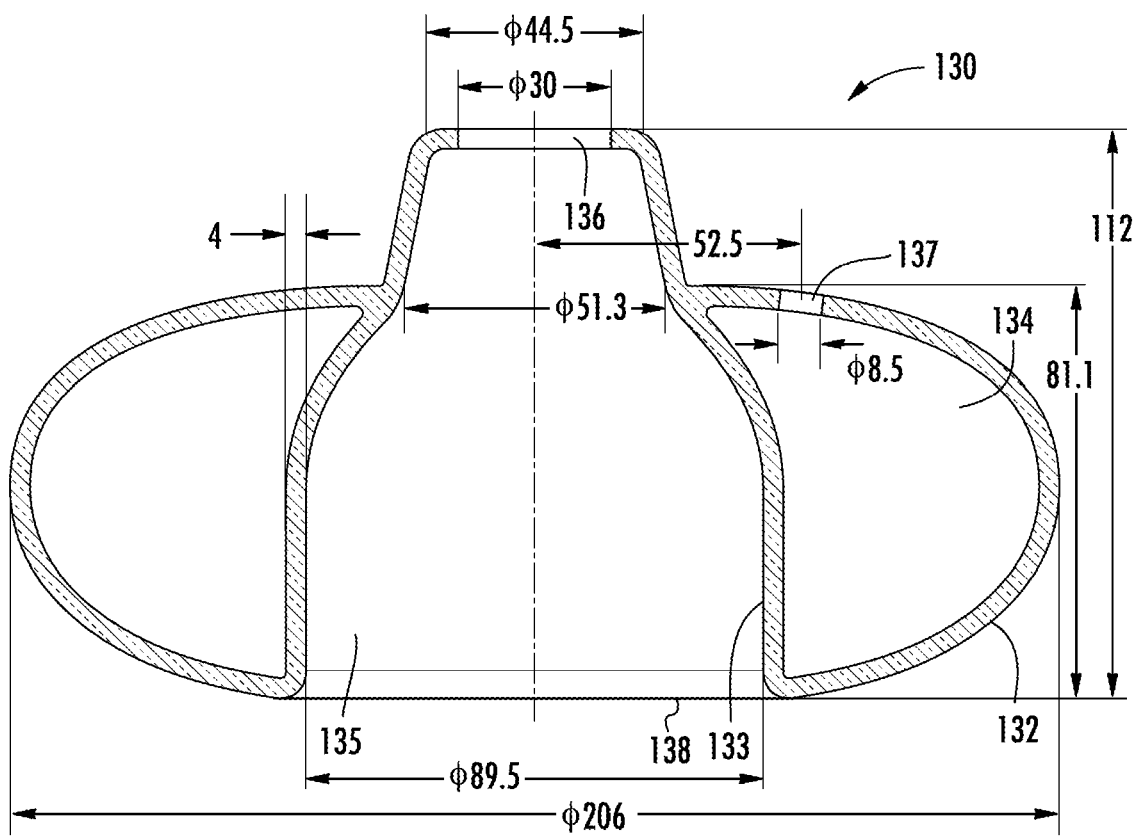
FIG. 16 is a cross-sectional, side view of a vessel configured to contain a liquid for use in the light fixture of FIG. 9.
Figure 17:
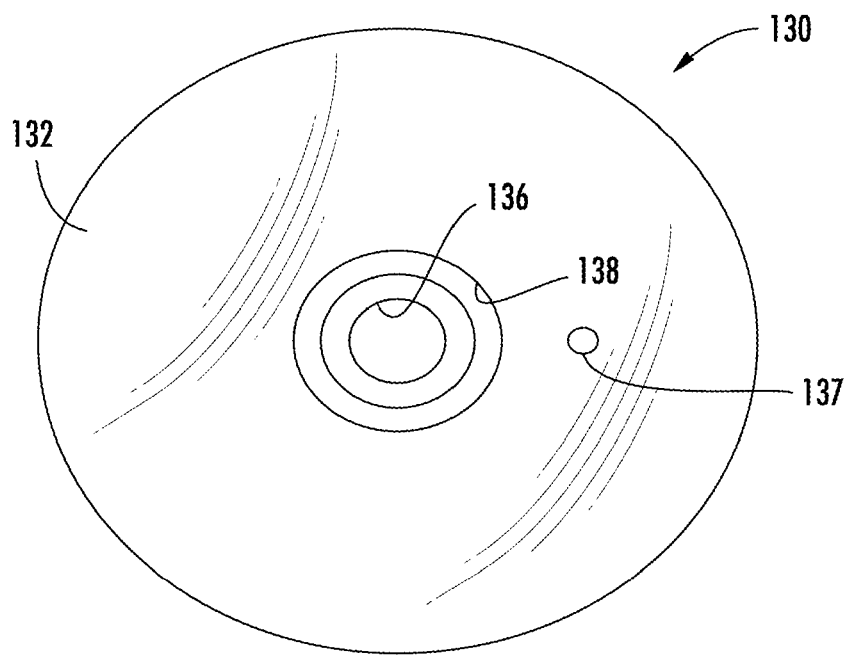
FIG. 17 is a top view of the vessel of the light fixture of FIG. 9.

The vessel 130 is substantially hollow (prior to assembly) and is configured to receive and contain a liquid 131 (such as water, although a variety of different liquids may be used). As described further herein, the vessel 130 is configured to circumferentially surround at least a portion of the light source 170 (when the light source 170 is received by and coupled to the light receiver 140) and/or the light receiver 140. The vessel 130 is configured such that light emitted from the light source 170 passes through the liquid 131 contained within the vessel 130. The vessel 130 may be constructed out of a variety of translucent or transparent materials, including but not limited to glass such that the light from the light source 170 radiates through the vessel 130 and into the surrounding environment that the vessel 130 is positioned within. As shown in FIGS. 14-16, the vessel 130 includes an outer wall 132 and an inner wall 133 that define an enclosed, hollow, inner area 134 that is configured to receive and contain the liquid 131. The outer wall 132 extends radially outwardly along the entire circumference of the inner wall 133 and the top and bottom ends of the outer wall 132 are attached to the inner wall 133, thus forming the enclosed area 134 radially outward from the inner wall 133. According to one embodiment, the outer wall 132 is curved along its height and has a substantially rounded or ovoid shape to distribute light from the light source 170 through a given space (e.g., a room). For example, the outer wall 132 may include a top portion, a side portion, and a bottom portion. The top portion and the bottom portion extend radially between the side portion and the inner wall 132. The side portion extends axially between the top portion and the bottom portion (and may be curved along its axial length). However, the outer wall 132 may have a variety of different shapes, depending on the desired configuration. According to various embodiments, depending on the shape and size of the inner wall 133 and the outer wall 134, the vessel 130 may have additional walls (in addition to the outer wall 132 and the inner wall 133) that further define the enclosed area 134.

As shown in FIGS. 14-17, the top portion of the outer wall 132 defines a side opening 137 (i.e., a through-hole through the outer wall 132) that provides an area for the user to access the enclosed area 134 to add liquid 131 to, remove liquid 131 from, or replace the liquid 131 within the enclosed area 134. For example, the liquid 131 can be poured through the side opening 137 and into the enclosed area 134 of the vessel 130. Aside from the side opening 137, the vessel 130 does not define any other openings (and therefore only defines the one side opening 137) that lead into the enclosed area 134 within the vessel 130 (and through which the liquid 131 can enter into and exit from the enclosed area 134 of the vessel 30). The vessel 130 further includes a cap or plug 139 that is configured to be attachable and reattachably detachable to the side opening 137 to close or seal off the side opening 137 to prevent leaks and to allow the user to access the enclosed area 134 if needed (e.g., to at least partially fill the vessel 131 with the liquid 131, to at least partially empty the liquid 137 from the liquid 131, or to clean the enclosed area 134 of the vessel 131). The plug 139 may be constructed out of a variety of different sealing materials (including but not limited to rubber or silicone). Accordingly, when the plug 139 is attached to the side opening 137, the enclosed area 134 is fully enclosed. Without the plug 139 attached, the enclosed area 134 is fully enclosed aside from the side opening 137.

As further shown in FIGS. 14-15, the inner wall 133 also defines an open area 135 that is configured to receive at least a portion of the light source 170 and/or the light receiver 140 such that the inner wall 133 circumferentially surrounds at least a portion of the light source 170 (when the light source 170 is attached to the light receiver 140) and/or the light receiver 140. In particular, the light receiver 140 is configured to position at least a portion of the light source 170 within the open area 153. The open area 135 is positioned radially inward from the inner wall 133 (and from the enclosed area 134) and is fluidly separated from the enclosed area 134.

Figure 13:
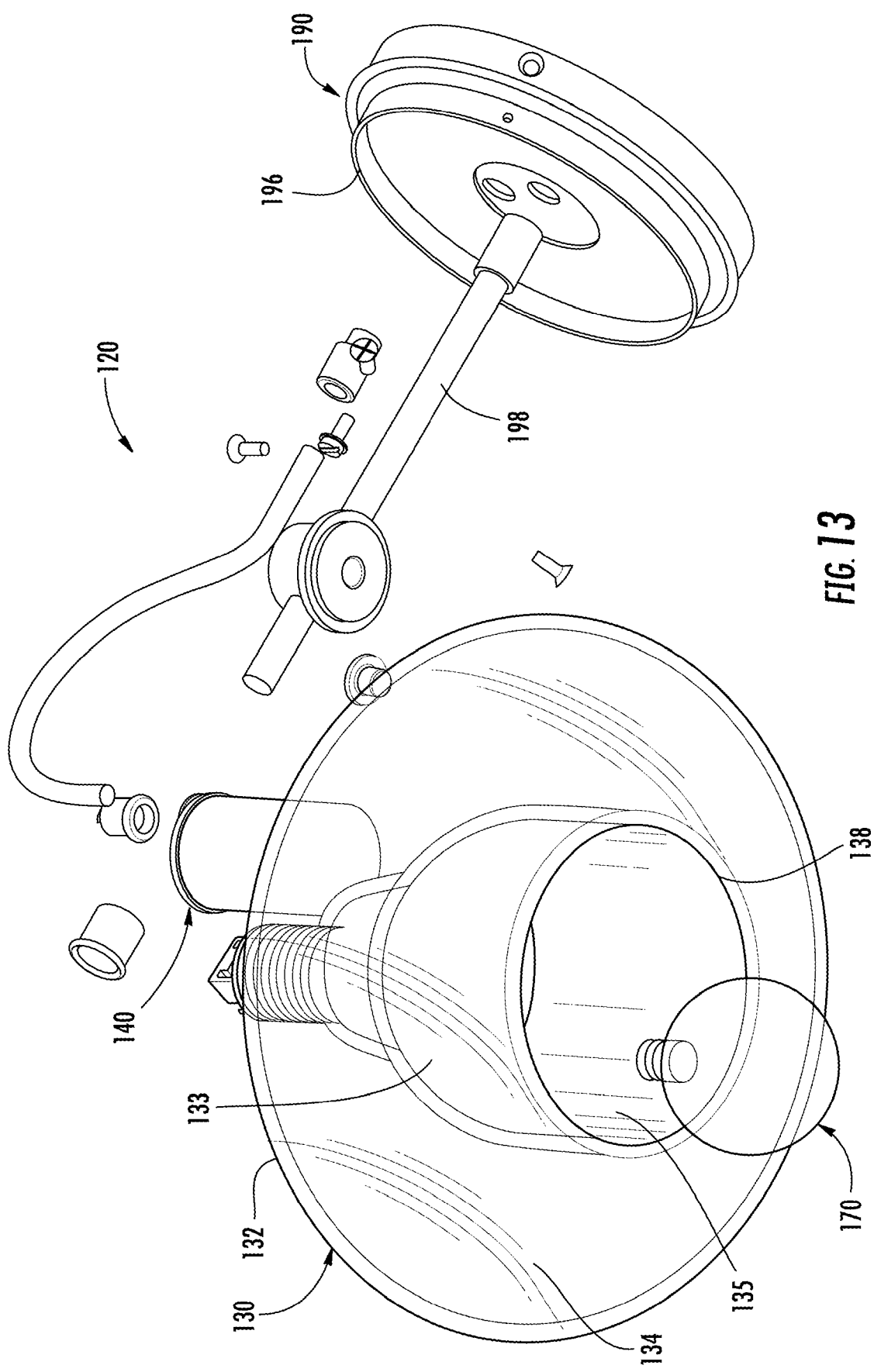
FIG. 13 is an exploded, bottom perspective view of the light fixture of FIG. 9.

The inner wall 133 defines a top opening 136 and a bottom opening 138 such that the open area 135 is a through-hole extending through the middle of the vessel 130 and through the enclosed area 134. The top opening 136 provides an area for the wiring and connections of the light receiver 140 to extend through (and to attach to other portions of the light fixtures structure 120, such as the mounting structure 190) and has a smaller diameter than at least a portion of the outer diameter of the light receiver 140 such that at least a portion of the light receiver 140 does not move through the top opening 136, thereby attaching the light receiver 140 and the light source 170 to the rest of the light fixture 120, as shown in FIG. 14. The light receiver 140 may optionally extend partially through the top opening 136. For example, according to various embodiments, the light receiver 140 may be assembled together by attaching a first portion of the light receiver 140 (that is above the top opening 136) and a second portion of the light receiver 140 (that is below the top opening 136 and within the open area 135) together through the top opening 136. The bottom opening 138 is sized to be large enough to receive the light source 170 therethrough. For example, the bottom opening 138 allows the user to easily replace the light source 170 by inserting their hand into the open area 135 (through the bottom opening 138), detaching the light source 170 (e.g., unscrewing a lightbulb) from the light receiver 140, removing the light source 170 from the open area 135 (through the bottom opening 138, as shown in FIG. 13), and replacing the light source 170 (in the opposite manner). Meanwhile, the vessel 130 can remain attached to the rest of the light fixture 120 while the light source 170 is being replaced.

Due to the configuration of the inner wall 133 and the outer wall 134, the liquid 131 and the light source 170 and the receiver 140 are fluidly separated from each other. In particular, the liquid 131 is positioned within the enclosed area 134 (radially outside of the inner wall 133), and the light source 170 and/or the light receiver 140 are positioned within the open area 135 (radially inside of the inner wall 133). Accordingly, the light source 170 and the light receiver 140 are separated from the enclosed area 134 (and thus the liquid 131) by the inner wall 133. According to various embodiments, the light fixture 120 may include a light guide (positioned with the light source 170), which may include the various features and configuration as the light guide 50 (as described further herein), except where noted otherwise. However, the light guide of the light fixture 120 is not positioned within the liquid 131 and within the enclosed area 134, but instead is positioned within the open area 135.

Although the vessel 130 is configured to receive and contain the liquid 131, the light fixture 120 can still be properly operated without putting any liquid 131 into the vessel 130. Furthermore, the vessel 130 may be completely or partially filled with liquid 131, according to the desired configuration. According to one embodiment, the vessel 130 may be approximately 50% full of liquid 131. As noted with respect to the embodiment shown in FIGS. 1-3, the water level may vary according to other exemplary embodiments.

The light receiver 140 is configured to receive, attach to, secure and optionally provide to transmit power (e.g., electrical power) to the light source 170 and is positioned at least partially within the open area 135. In particular, the light receiver 140 secures the light source 170 to the rest of the light fixture 120 and axially aligns the light source 170 with the enclosed area 135. Accordingly, the light from the light source 170 is transmitted through the inner wall 133, the enclosed area 135, and the outer wall 132 (and through any liquid 131 within the enclosed area 135) before transmitting to the rest of the environment that the light fixture 120 is positioned within. The light receiver 140 includes a light socket or receptacle that is configured to attach to the light source 170. As shown in FIGS. 14-15, the inner wall 133 of the vessel 130 extends axially above the top portion of the outer wall 132 to create an elevated area and provide additional axial room within the open area 135 to house, contain, and secure at least a portion of the light source 170 and/or the light receiver 140. Accordingly, the open area 135 extends axially above the enclosed area 134, and at least a portion of the light source 170 and/or the light receiver 140 may be elevated axially above at least a portion of the enclosed area 134. This elevated area allows the at least a portion of the light receiver 140 to be positioned within the open area 135 of the vessel 130, while providing enough clearance to still position and axially align the light source 170 at least partially at the same level as the liquid 131 within the open area 135.

The light source 170 is configured to emit light and may include a variety of different light-emitting devices such as a lightbulb, as shown in FIGS. 9-15. The light source 170 is electrically powered and coupled to the light receiver 140. As further shown in FIG. 14, a top end of the light source 170 is attached to and received by a bottom end of the light receiver 140 (through, for example, a threaded connection), which may optionally provide power to the light source 170 (through wires that extend through a wall and the mounting structure 190). The light source 170 is positioned such that the light is directed and emitted radially outward, through the inner wall 133, through any liquid 131 in the enclosed area 134, out through the outer wall 132, and subsequently into the surrounding area (e.g., a room). The light may also be emitted through the bottom opening 138.

Figure 9:
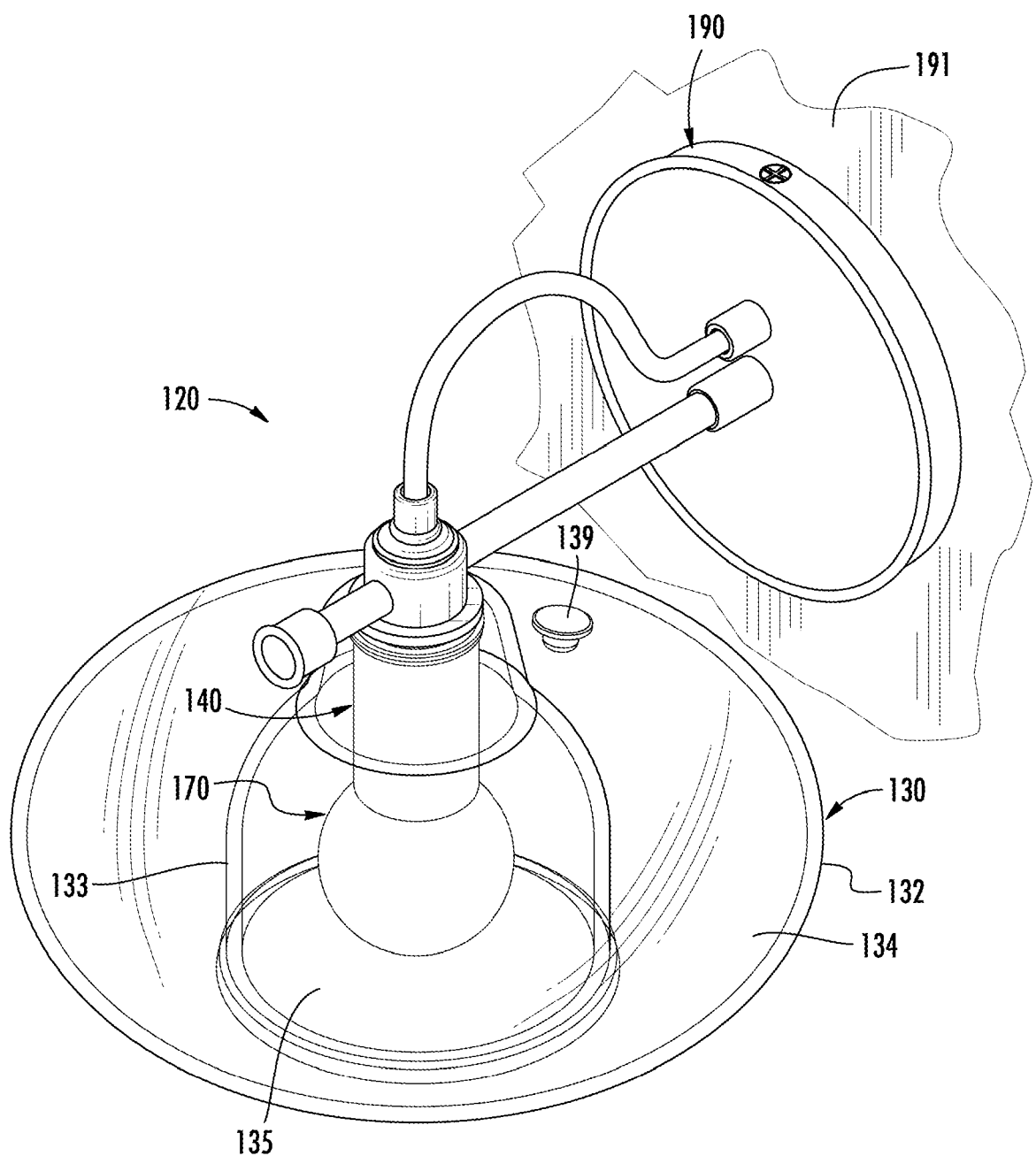
FIG. 9 is a perspective view of a light fixture according to another embodiment.
Figure 11:
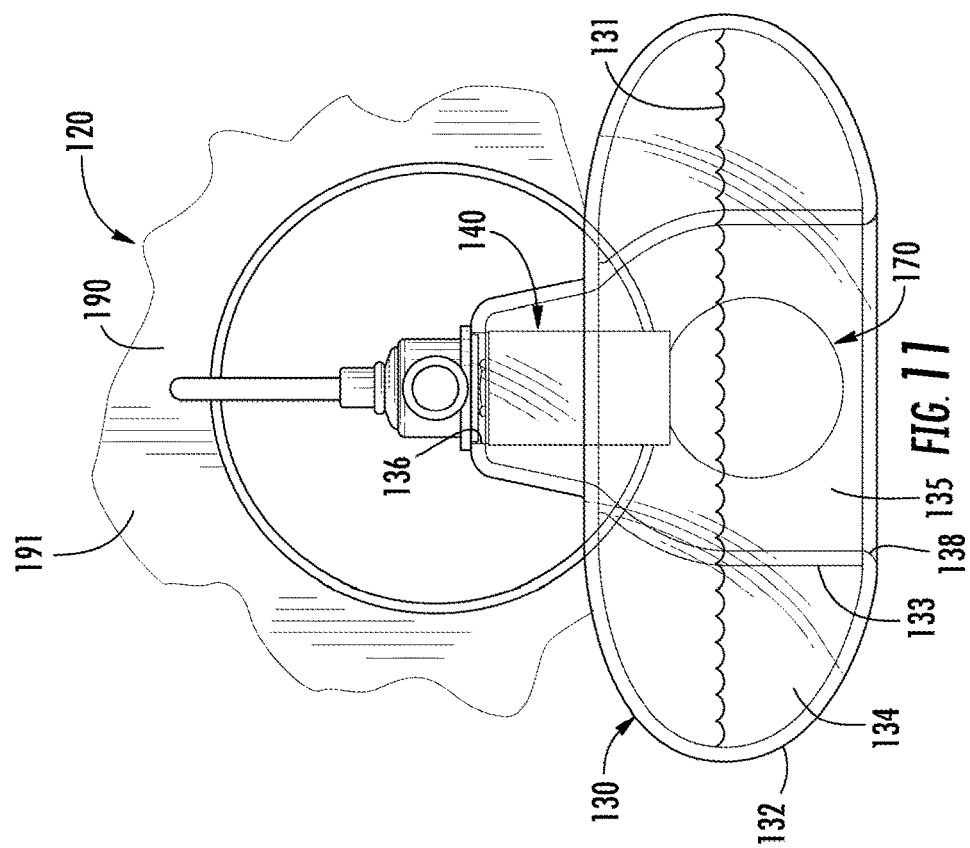
FIG. 11 is a front view of the light fixture of FIG. 9.
Figure 10:
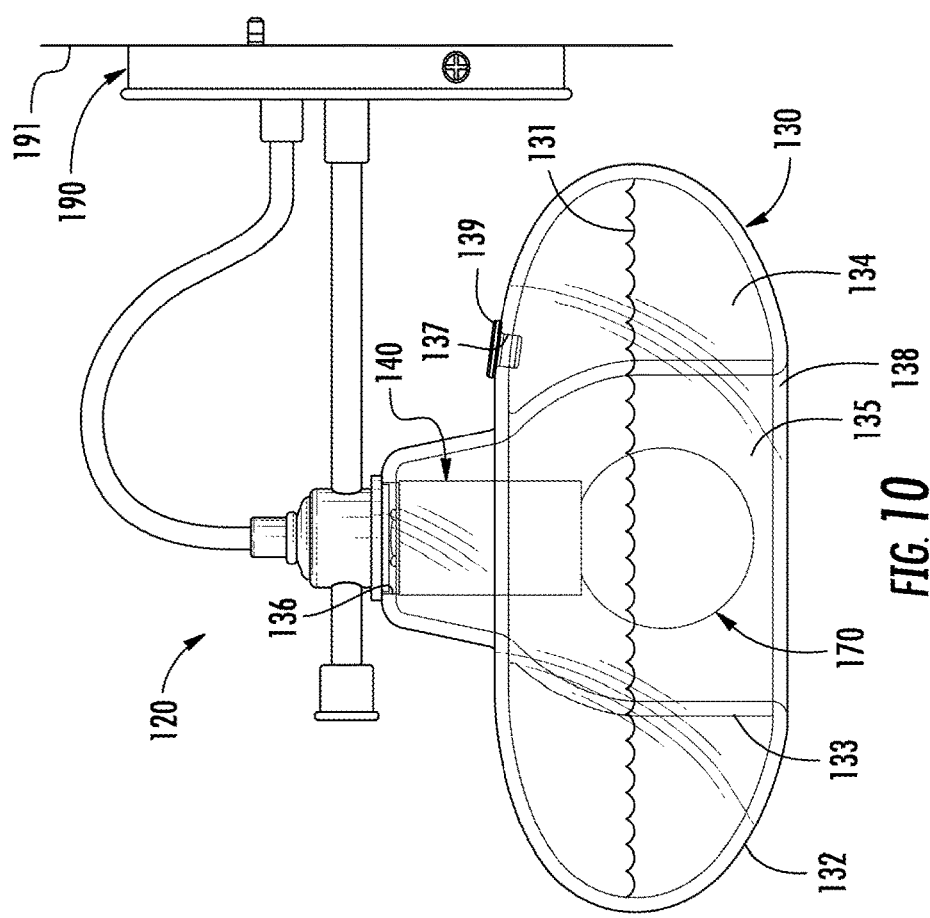
FIG. 10 is a side view of the light fixture of FIG. 9.
Figure 12:
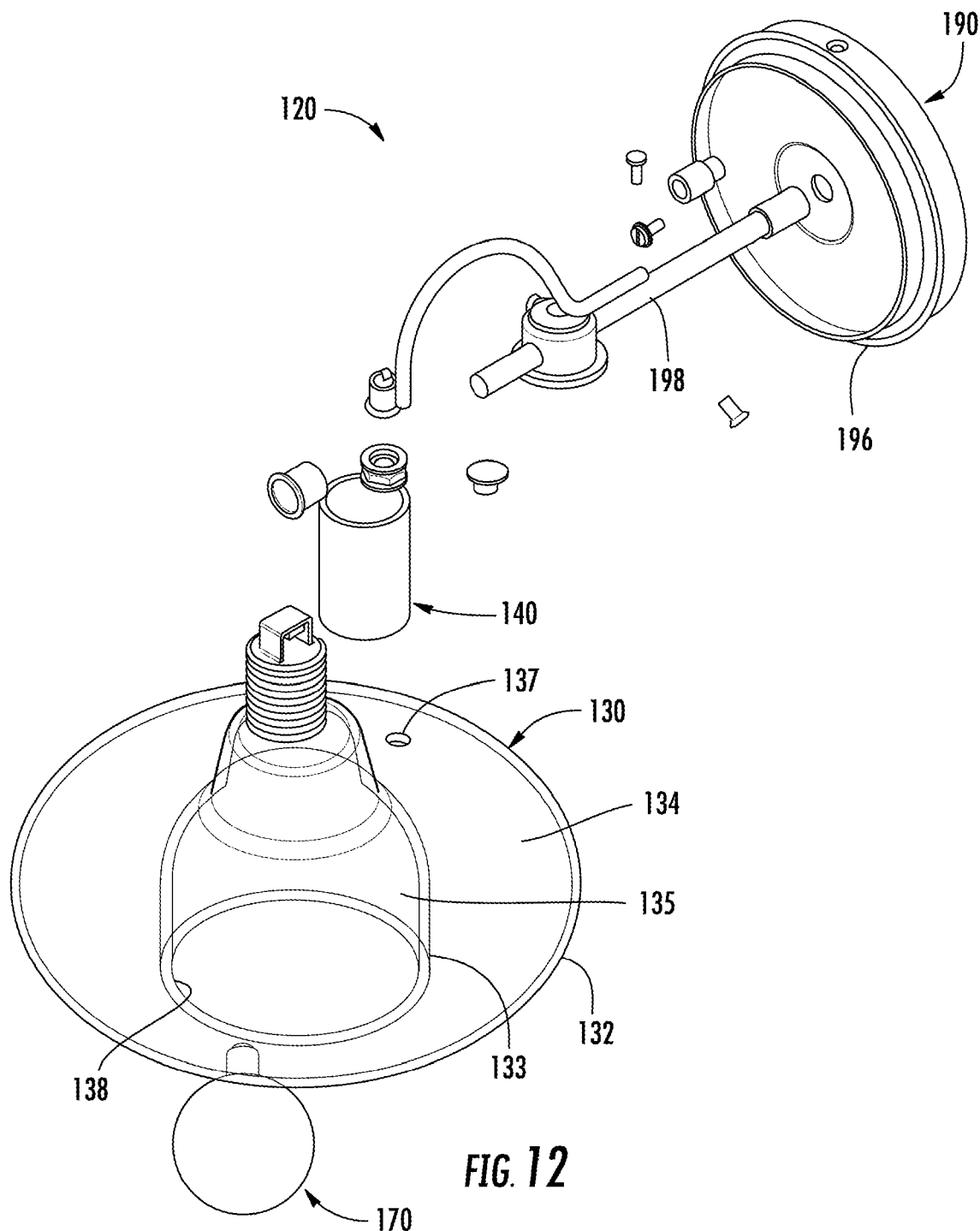
FIG. 12 is an exploded, top perspective view of the light fixture of FIG. 9.

As shown in FIGS. 9-10, the mounting structure 190 (such as a wall mount structure) is configured to mount or attach the rest of the light fixture 120 to a support structure, such as the wall 191. However, the light fixture 120 may include other mounting structures or hardware to allow the light fixture 120 to be positioned along or attached to other support structures or areas, including but not limited to a door, a floor, or a table. As shown in FIGS. 14-15, wiring to power the light source 170 may extend through the mounting structure 190 (and the light receiver 140) to power and control the light source 170. The mounting structure 190 may include various mounting hardware components, such as a mounting bracket or plate 192, fasteners 194 (e.g., screws), a canopy or mounting cover 196, and a connecting structure 198. The connecting structure 198 is configured to attach the mounting cover 196 to the light receiver 140. The vessel 130, the light receiver 140, and the light source 170 may optionally be movable and pivotable by the user along the length of the connecting structure 198 (e.g., closer to or further from the mounting plate 192 and the mounting cover 196), according to the desired position.

To assemble the light fixture 120, the mounting structure 190 is mounted to the wall 191, and appropriate wiring is electrically connected to power the light fixture 120. A top portion of the light receiver 140 is attached to the mounting structure 190, the top of the inner wall 133 (along the top opening 136) is positioned along the bottom end of the top portion of the light receiver 140, and the bottom portion of the light receiver 140 is inserted into the vessel 130 (through the bottom opening 138 and into the open area 135). The top portion and the bottom portion of the light receiver 140 are subsequently attached to each other through the top opening 136 of the vessel 130 such that a portion of the light receiver 140 extends through the top opening 136. As shown in FIG. 14, a top part of the light receiver 140 is positioned above and outside of the vessel 130 (above the top opening 136), and a bottom part of the light receiver 140 is positioned within the open area 135 of the vessel 130 (below the top opening 136). This configuration of the light receiver 140 attaches the vessel 130 to the mounting structure 190. The light source 170 is then attached to the light receiver 140. In particular, the light source 170 is inserted into the vessel 130 (through the bottom opening 138 and into the open area 135). The light source 170 is subsequently attached and secured to the bottom portion of the light receiver 140 (by, for example, screwing the light source 170 into the light receiver 140). The enclosed area 134 of the vessel 130 may be at least partially filled with the liquid 131 before, after, and/or during assembly.

Unless otherwise specified herein, the various components of the light fixture 120 may be constructed out of a variety of different materials such as steel, plastic, brass, ceramic, copper, iron, and aluminum. According to one embodiment, the height and width of the entire light fixture 120 is approximately 7¼ inches (in) and 9⅜ in, respectively, the diameter of the vessel 130 is approximately 8⅛ in, and the height of the mounting cover 196 is approximately 4⅞ in. FIG. 16 shows various exemplary sizes of various portions of the vessel 130, according to one embodiment.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the light fixtures, as shown in the various exemplary embodiments, are illustrative only. Additionally, any element disclosed in one embodiment may be incorporated or utilized with any other embodiment disclosed herein. For example, each of the various components of the various light fixtures described herein may be incorporated into any other embodiment of this disclosure. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A light fixture comprising:
a light receiver;
an electrically-powered light source coupled to the light receiver, the light receiver comprising at least one electrical connection configured to transmit electric power to the light source; and
a vessel containing a liquid;
wherein the vessel comprises an outer wall and an inner wall that define an enclosed area that is configured to receive and contain the liquid;
wherein the enclosed area comprises a top surface portion;
wherein the vessel comprises a top portion, the top portion comprising a first opening and a second opening, the second opening defining a circumferential gap in the top surface portion of the enclosed area;
wherein a point of electrical interface between the light source and the at least one electrical connection is disposed below the circumferential gap in the top surface portion of the enclosed area;
wherein the inner wall defines an open area positioned radially inward from the enclosed area;
wherein the inner wall includes the first opening and a bottom opening such that the open area is a through-hole extending through the enclosed area; and
wherein the vessel is configured such that light emitted from the light source passes through the liquid.

2. The light fixture of claim 1, wherein the light receiver is configured to axially align the light source with the enclosed area.

3. The light fixture of claim 1, wherein the open area is devoid of the liquid.

4. The light fixture of claim 1, wherein the light receiver is configured to position at least a portion of the light source within the open area.

5. The light fixture of claim 1, wherein the light receiver is positioned at least partially within the open area.

6. The light fixture of claim 1, wherein the inner wall extends axially above the outer wall such that the open area extends axially above the enclosed area.

7. The light fixture of claim 1, wherein the light source is accessible through the bottom opening of the inner wall.

8. The light fixture of claim 1, wherein the light receiver extends through the first opening of the inner wall of the vessel.

9. The light fixture of claim 1, wherein the light receiver is configured to axially align the light source with the open area.

10. The light fixture of claim 1, wherein a diameter of the first opening of the inner wall is less than at least a portion of an outer diameter of the light receiver.

11. The light fixture of claim 1, wherein the first top opening of the inner wall is configured to receive the at least one electrical connection of the light receiver.

12. The light fixture of claim 1, wherein the at least one electrical connection comprises a light socket that is configured to secure and transmit the electric power to the light source.

13. The light fixture of claim 1, wherein the outer wall of the vessel includes an opening fluidly coupled to the enclosed area and configured to receive the liquid.

14. The light fixture of claim 13, wherein the vessel includes a plug removably coupled to the opening and configured to seal the opening.

15. The light fixture of claim 1, wherein the light source is positioned such that the light is emitted radially outward through the inner wall, through the liquid in the enclosed area, out through the outer wall, and into a surrounding area.

16. The light fixture of claim 15, wherein the light is emitted through the bottom opening of the inner wall.

17. The light fixture of claim 1, wherein the light receiver is configured to couple the vessel to a mounting structure to mount the vessel relative to an area.

18. The light fixture of claim 17, wherein the vessel is movably coupled to the mounting structure such that the vessel is movable relative to the area.

19. The light fixture of claim 1, wherein the light source is removably coupled to a bottom portion of the light receiver by one or more threads.

20. The light fixture of claim 1, wherein the outer wall of the vessel comprises an ovoid shape.

\* \* \* \* \*